US011940744B2

(12) United States Patent
Hagiwara et al.

(10) Patent No.: US 11,940,744 B2
(45) Date of Patent: Mar. 26, 2024

(54) TRANSFER DEVICE AND IMAGE FORMING APPARATUS FOR SWITCHING A TRANSFER ROLLER BETWEEN PRESSED AND SEPARATED STATES

(71) Applicant: FUJIFILM Business Innovation Corp., Tokyo (JP)

(72) Inventors: Kazuyoshi Hagiwara, Kanagawa (JP); Tomoaki Yoshioka, Kanagawa (JP); Yoko Miyamoto, Kanagawa (JP); Kazuki Kishi, Kanagawa (JP); Toshiaki Baba, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/552,637

(22) Filed: Dec. 16, 2021

(65) Prior Publication Data

US 2023/0068278 A1 Mar. 2, 2023

(30) Foreign Application Priority Data

Aug. 25, 2021 (JP) ................................ 2021-137607

(51) Int. Cl.
*G03G 15/00* (2006.01)
*G03G 15/01* (2006.01)
*G03G 15/16* (2006.01)
*G03G 15/20* (2006.01)

(52) U.S. Cl.
CPC ..... *G03G 15/1615* (2013.01); *G03G 15/0136* (2013.01); *G03G 15/0189* (2013.01);
(Continued)

(58) Field of Classification Search
CPC ........... G03G 15/1615; G03G 15/1605; G03G 15/1665; G03G 15/167; G03G 15/0136; G03G 15/0189; G03G 2215/1695; G03G 2215/1685; G03G 2215/1676; G03G 2215/0193; B41J 13/223
(Continued)

(56) References Cited

U.S. PATENT DOCUMENTS 4,541,709 A * 9/1985 Kampschreur .... G03G 15/1605 399/167
5,153,656 A * 10/1992 Johnson ............. G03G 15/2021 399/329
(Continued)

FOREIGN PATENT DOCUMENTS

JP S58-5769 A 1/1983
JP 4407008 B2 * 2/2010 ......... G03G 15/0194
(Continued)

*Primary Examiner* — Robert B Beatty
(74) *Attorney, Agent, or Firm* — Oliff PLC

(57) ABSTRACT

A transfer device includes a transfer drum that rotates in conjunction with a fixing roller, a transfer belt that transfers an image onto a medium while rotating along with the transfer drum in a state where the medium is nipped between the transfer belt and the transfer drum, a pressing member that is disposed in a space enclosed by the transfer belt, and a switching unit that moves the pressing member and switches between a pressed state in which the transfer belt is pressed against the transfer drum and a separated state in which the transfer belt is separated from the transfer drum.

15 Claims, 10 Drawing Sheets

(52) U.S. Cl.
CPC ......... *G03G 15/167* (2013.01); *G03G 15/205* (2013.01); *G03G 2215/0193* (2013.01); *G03G 2215/1695* (2013.01)

(58) Field of Classification Search
USPC ......... 399/66, 302, 303, 304, 305, 307, 308, 399/317
See application file for complete search history.

(56) References Cited

U.S. PATENT DOCUMENTS

| | | | | | |
|---|---|---|---|---|---|
| 6,002,907 | A * | 12/1999 | Berkes | G03G 15/161 | 399/148 |
| 7,711,301 | B2 * | 5/2010 | Takemoto | G03G 15/162 | 399/302 |
| 8,509,662 | B2 * | 8/2013 | Tanaka | G03G 15/161 | 399/304 |
| 2003/0063930 | A1 * | 4/2003 | Kiuchi | G03G 15/161 | 399/307 |
| 2008/0069610 | A1 * | 3/2008 | Nakafuji | G03G 15/24 | 399/329 |
| 2011/0013950 | A1 * | 1/2011 | Furuya | G03G 15/0194 | 399/302 |
| 2012/0063820 | A1 * | 3/2012 | Chiba | G03G 15/0189 | 399/304 |
| 2012/0237229 | A1 * | 9/2012 | Okamoto | G03G 15/2032 | 399/33 |

FOREIGN PATENT DOCUMENTS

| | | | | |
|---|---|---|---|---|
| JP | 2012198496 A | * | 10/2012 | G03G 15/0131 |
| WO | WO-2021054292 A1 | * | 3/2021 | G03G 15/2028 |

* cited by examiner

TRANSFER DEVICE AND IMAGE FORMING APPARATUS FOR SWITCHING A TRANSFER ROLLER BETWEEN PRESSED AND SEPARATED STATES

CROSS-REFERENCE TO RELATED APPLICATIONS

This application is based on and claims priority under 35 USC 119 from Japanese Patent Application No. 2021-137607 filed Aug. 25, 2021.

BACKGROUND

(i) Technical Field

The present disclosure relates to a transfer device and an image forming apparatus.

(ii) Related Art

Japanese Unexamined Patent Application Publication No. 58-5769 describes a transfer device that transfers an image on an image carrier, the transfer device including a transfer-material transport unit that endlessly moves a transfer member along a circular movement path, a gripper piece that is attached to the transport unit and rotatably supported by a rotary shaft so as to perform a rotational operation with respect to a base member and that holds a leading end side of the transfer member, and a switching member that is attached to the base member. In the transfer device, by cutting away a portion of the gripper piece, the portion being located at a position corresponding to the switching member, the presence of the transfer material in the gripper is detected.

SUMMARY

Aspects of non-limiting embodiments of the present disclosure relate to obtaining a transfer device capable of preventing, in a configuration in which a transfer drum rotates in conjunction with a fixing roller, a transfer belt from rotating along with rotation of the transfer drum during a period when image formation is not performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a transfer device including a transfer drum that rotates in conjunction with a fixing roller, a transfer belt that transfers an image onto a medium while rotating along with the transfer drum in a state where the medium is nipped between the transfer belt and the transfer drum, a pressing member that is disposed in a space enclosed by the transfer belt, and a switching unit that moves the pressing member and switches between a pressed state in which the transfer belt is pressed against the transfer drum and a separated state in which the transfer belt is separated from the transfer drum.

BRIEF DESCRIPTION OF THE DRAWINGS

An exemplary embodiment of the present disclosure will be described in detail based on the following figures, wherein.

DETAILED DESCRIPTION

Figure 1:
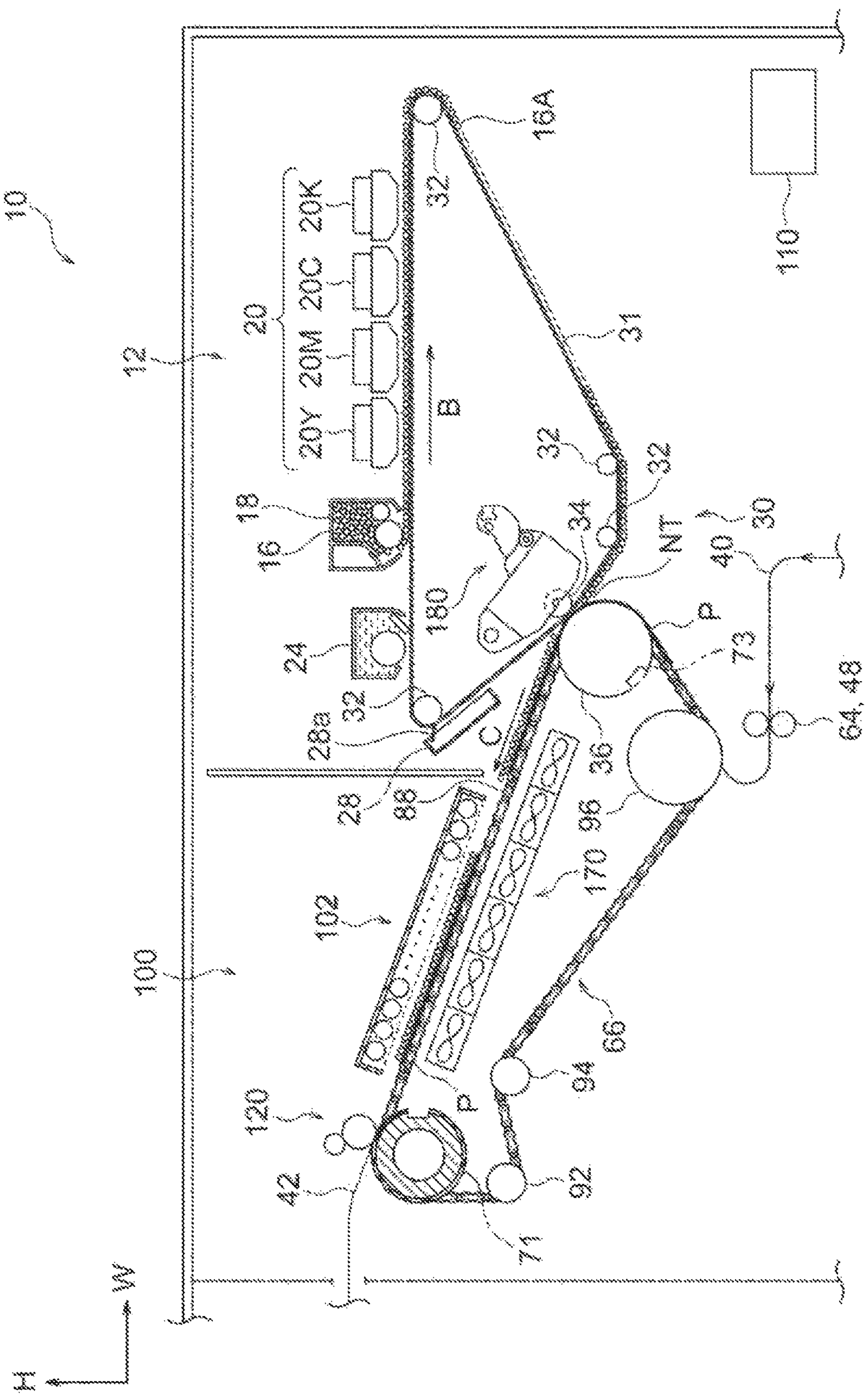
FIG. 1 is a schematic front view illustrating a transfer device, a fixing device, and a chain gripper according to an exemplary embodiment of the present disclosure.

An example of a transfer device according to an exemplary embodiment of the present disclosure and an example of an image forming apparatus according to the exemplary embodiment of the present disclosure will be described with reference to FIG. 1 to FIG. 9. Note that, arrow H, arrow W, and arrow D that are illustrated in the drawings respectively indicate the height direction of the image forming apparatus (vertical direction), the width direction of the image forming apparatus (horizontal direction), and the depth direction of the image forming apparatus (horizontal direction).

(Image Forming Apparatus 10)

Figure 8:
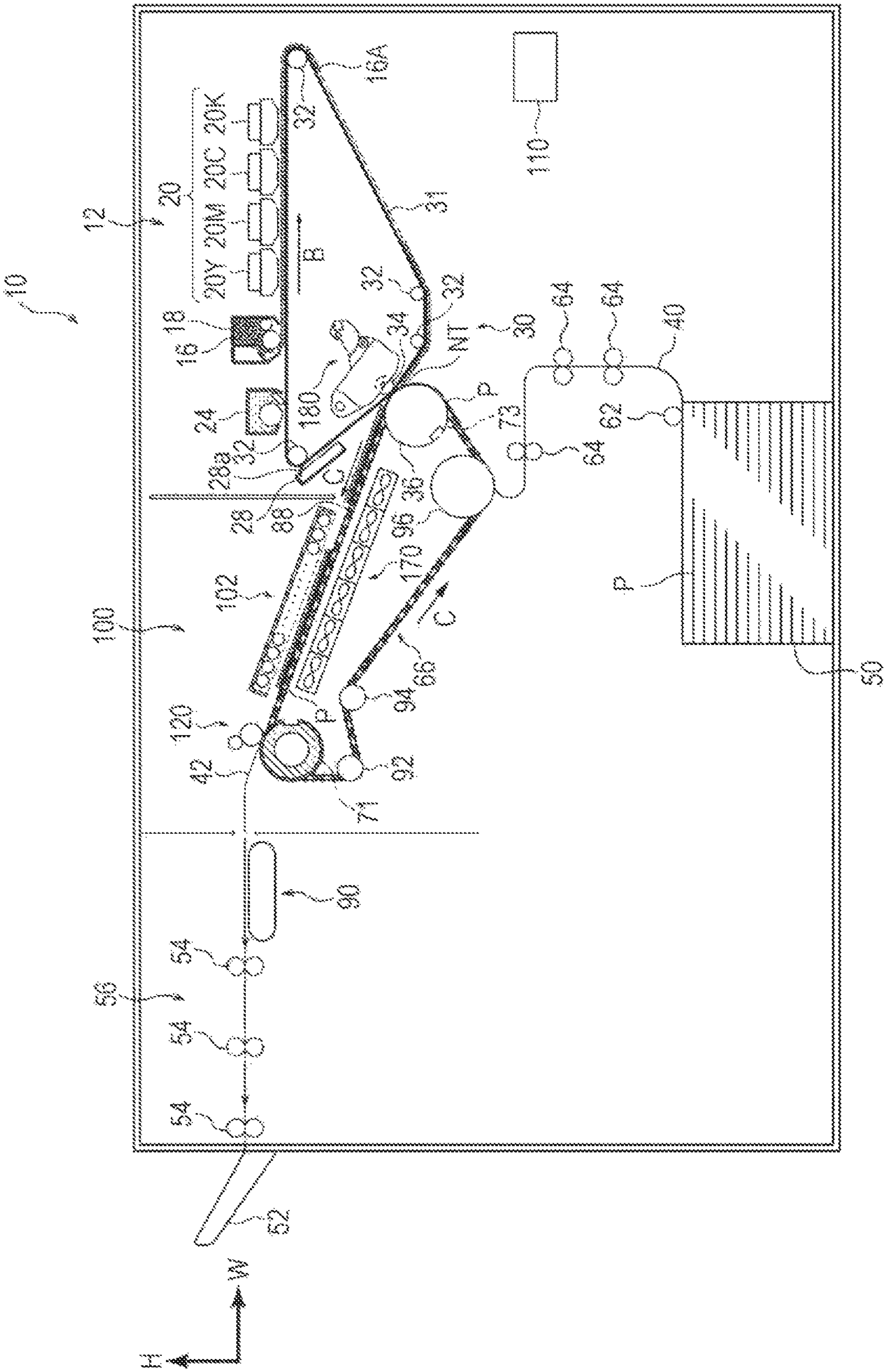
FIG. 8 is a schematic front view illustrating a configuration of an image forming apparatus according to the exemplary embodiment of the present disclosure.

An image forming apparatus 10 according to the present exemplary embodiment is an image forming apparatus that employs an ink-jet system and forms an ink image onto a sheet member P on the basis of image information input thereto. The sheet member P is an example of a medium. The ink image is an example of an image. As illustrated in FIG. 8, the image forming apparatus 10 includes an accommodating unit 50, a sheet feed mechanism 48, a chain gripper 66, a transfer device 30, an image forming section 12, a fixing device 100, a cooling unit 90, a sheet ejection mechanism 56, and an ejection unit 52. The image forming apparatus 10 further includes a control device 110 that outputs, on the basis of image information input to the image forming apparatus 10 or a detection result obtained by a sensor or the like, control information so as to control the operation of each unit of the image forming apparatus 10.

[Accommodating Unit 50]

The accommodating unit 50 has a function of accommodating the sheet member P.

[Sheet Feed Mechanism 48]

The sheet feed mechanism 48 has a function of transporting the sheet member P accommodated in the accommodating unit 50 to the chain gripper 66, which will be described later.

More specifically, as illustrated in FIG. 8, the sheet feed mechanism 48 includes a delivery roller 62 and a plurality of transport rollers 64 that transports the sheet member P along a sheet feed path 40 along which the sheet member P is transported.

The delivery roller 62 is a roller that sends out the sheet member P, which is accommodated in the accommodating unit 50, to the sheet feed path 40. The plurality of transport rollers 64 are rollers that transport the sheet member P, which has been sent out to the sheet feed path 40 by the delivery roller 62, to the chain gripper 66 (described below).

[Chain Gripper 66]

The chain gripper 66 has a function of transporting the sheet member P, which has been transported by the sheet feed mechanism 48, to a sheet ejection path 42 via the transfer device 30 and the fixing device 100, each of which will be described later. The chain gripper 66 is an example of a transport unit. As illustrated in FIG. 1, the chain gripper 66 includes a pair of chains 72, sprockets 71, 73, 92, 94, and 96, and a plurality of holding units 68 (see FIG. 5) including a plurality of holding members 76 that hold the leading end of the sheet member P.

Figure 5:
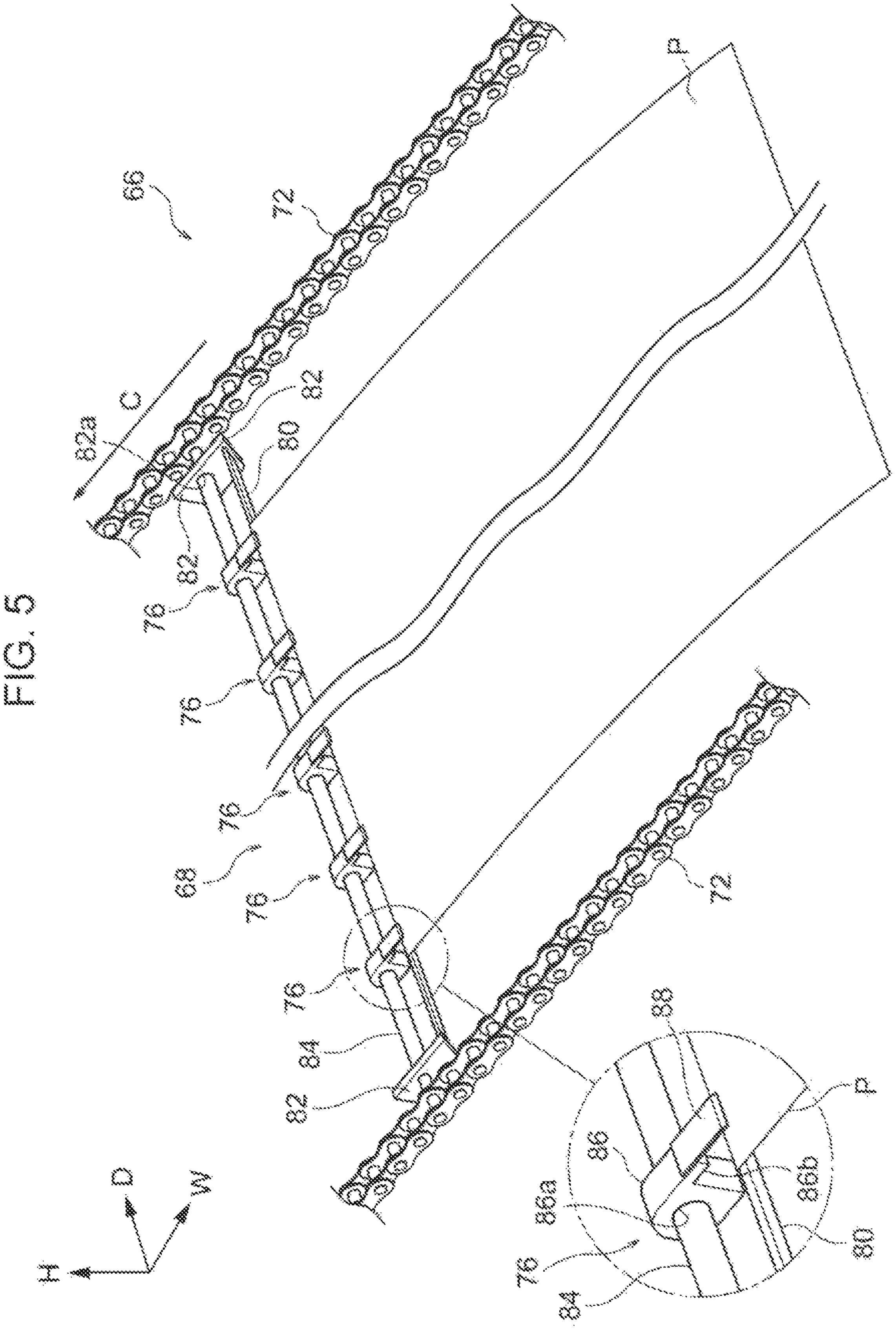
FIG. 5 is a perspective view illustrating the chain gripper according to the exemplary embodiment of the present disclosure.
Figure 6:
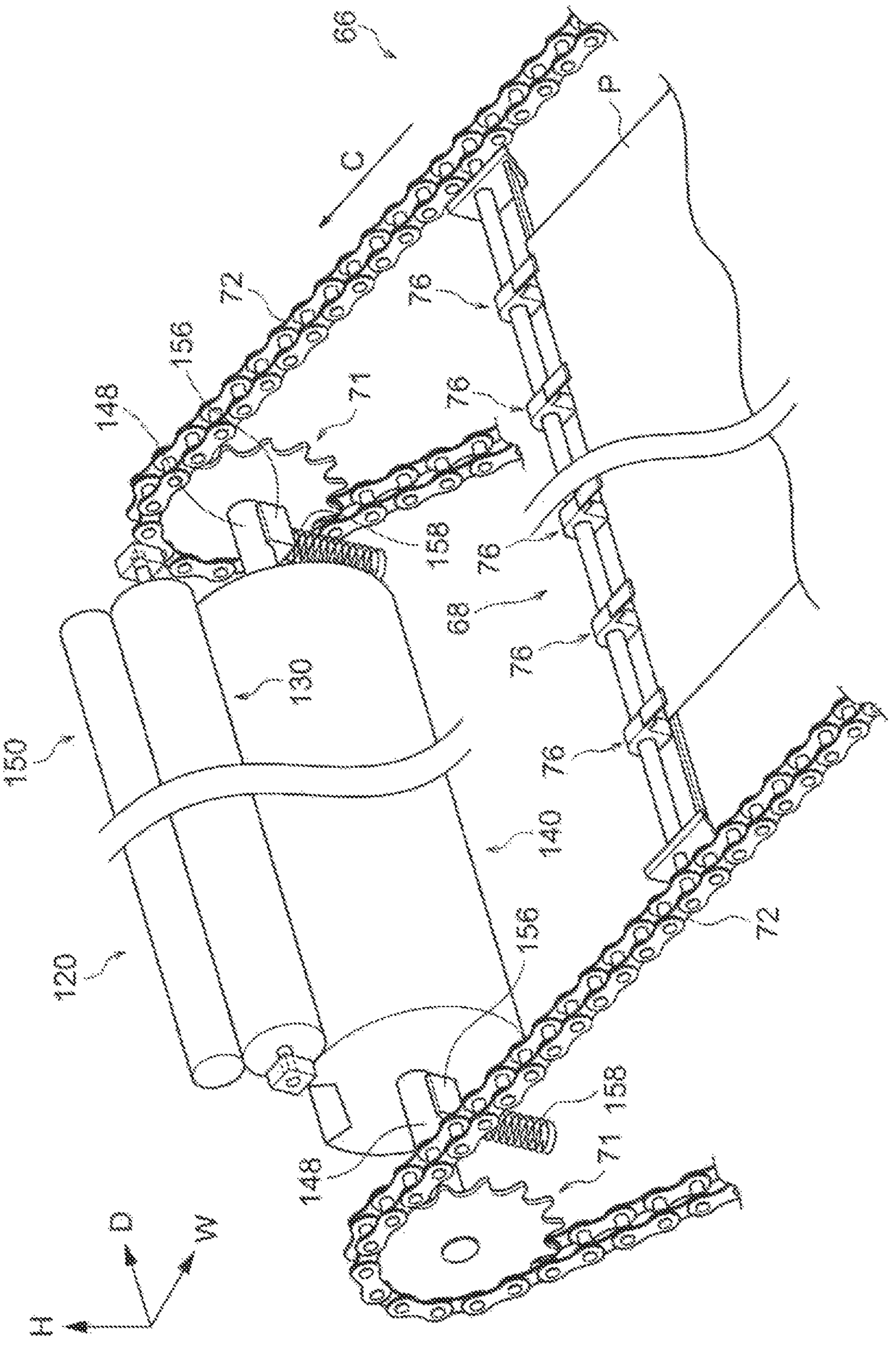
FIG. 6 is a perspective view illustrating the fixing device according to the exemplary embodiment of the present disclosure.
Figure 7:
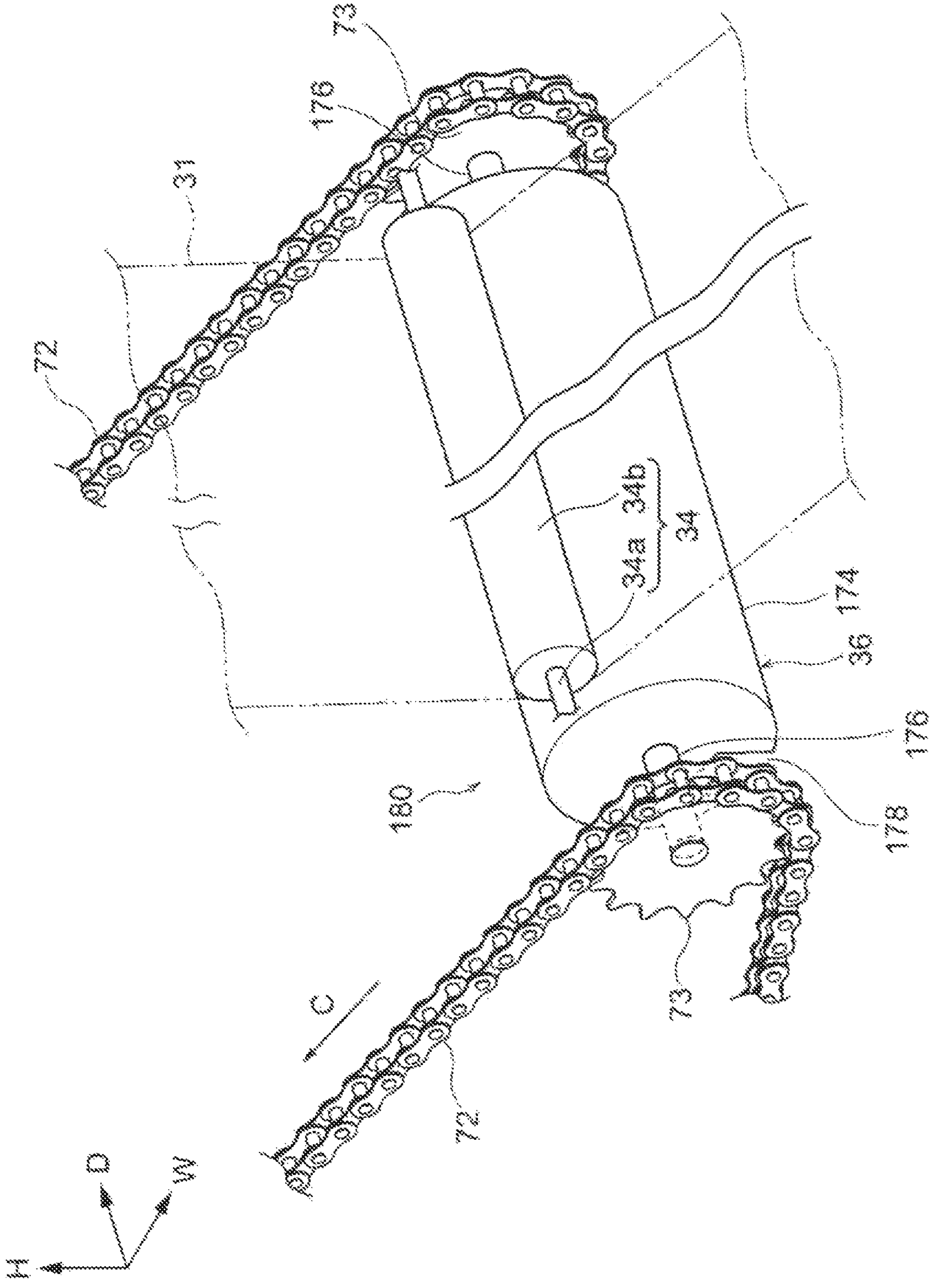
FIG. 7 is a perspective view illustrating a counter roller and the transfer roller according to the exemplary embodiment of the present disclosure.

As illustrated in FIG. 5, the pair of chains 72 are arranged in such a manner as to be spaced apart from each other in the depth direction of the image forming apparatus 10 (hereinafter referred to as "apparatus depth direction") and are each formed in an endless loop shape (see FIG. 1). As illustrated in FIG. 7, the pair of chains 72 are respectively disposed at one end and the other end of a counter roller 36, which will be described later, in the axial direction of the counter roller 36, and are each wound around one of the sprockets 73 whose axial direction is the same as the apparatus depth direction. In addition, as illustrated in FIG. 6, the pair of chains 72 are respectively disposed at one end and the other end of a pressure roller 140, which will be described later, in the axial direction of the pressure roller 140 and are each wound around one of the sprockets 71 whose axial direction is the same as the apparatus depth direction. Furthermore, as illustrated in FIG. 1, the pair of chains 72 are each wound around one of the pair of sprockets 92, one of the pair of sprockets 94, and one of the pair of sprockets 96, each pair being disposed with a gap formed therebetween in the apparatus depth direction.

In the above configuration, when a rotational force is transmitted to one of the plurality of sprockets 71, 73, 92, 94, and 96, the pair of chains 72 rotate around these sprockets in the direction of arrow C in FIG. 8 in such a manner as to move from the side on which the sprockets 73 are arranged to the side on which the sprockets 71 are arranged. In the present exemplary embodiment, a rotational force of the pressure roller 140 is transmitted to the sprockets 71. When the sprockets 71 are rotated by the pressure roller 140, the pair of chains 72, which are wound around the sprockets 71 and 73, cause the counter roller 36 that is provided with the sprockets 73 to rotate in conjunction with rotation of the sprockets 71 of the pressure roller 140. The chain gripper 66 including the sprockets 71 and 73 and the pair of chains 72 is an example of an interlocking unit. In this configuration, the chain gripper 66 transports the sheet member P held by the holding units 68 in a direction in which the pair of chains 72 move circularly.

The plurality of holding units 68 are arranged at a predetermined pitch in a circumferential direction of the chains 72 (the direction of rotation of the chains 72). In addition, as illustrated in FIG. 5, each of the holding units 68 extends in the apparatus depth direction, and two side portions of each of the holding units 68 in the apparatus depth direction are attached to the pair of chains 72. In addition, as illustrated in FIG. 5, each of the holding units 68 extends in the apparatus depth direction, and two side portions of each of the holding units 68 in the apparatus depth direction are attached to the pair of chains 72. The holding units 68 move along with rotation of the chains 72 in the direction of rotation of the chains 72.

As illustrated in FIG. 5, each of the holding units 68 includes a plate portion 80 that extends in the apparatus depth direction, a pair of support plates 82 that support the plate portion 80, and a shaft portion 84 that has two ends each of which is attached to one of the chains 72, the shaft portion 84 extending in the apparatus depth direction. In addition, each of the holding units 68 includes the holding members 76 that hold the leading end of the sheet member P between the holding members 76 and the plate portion 80.

The plate portion 80 is made of a stainless steel and disposed between the pair of chains 72. In addition, when viewed in the apparatus depth direction, the plate portion 80 is inclined in a sheet transport direction in such a manner that a portion of the plate portion 80 that is located on the upstream side in the sheet transport direction is closer to the sheet member P than a portion of the plate portion 80 that is located on the downstream side in the sheet transport direction is.

The support plates 82 are made of a stainless steel and arranged at the two end portions of the plate portion 80 such that the plate-thickness direction of the support plates 82 is the same as the apparatus depth direction. The two end portions of the plate portion 80 are each attached to one of the pair of support plates 82, so that the pair of support plates 82 support the plate portion 80. In addition, the support plates 82 each have a circular through hole 82*a*.

The shaft portion 84 is made of a stainless steel and extends in the apparatus depth direction, and the shaft portion 84 is disposed downstream from the plate portion 80 in the sheet transport direction. In addition, the shaft portion 84 extends through the through holes 82*a*, which are formed in the support plates 82. Furthermore, the two end portions of the shaft portion 84 are each attached to one of the pair of chains 72.

The plurality of holding members 76 are attached to the shaft portion 84 in such a manner as to be arranged at a predetermined pitch in the apparatus depth direction. Each of the holding members 76 includes a body portion 86 having a through hole 86*a* through which the shaft portion 84 extends and a contact portion 88 that comes into contact with the sheet member P.

The body portions 86 is made of aluminum, and when viewed in the apparatus depth direction, a portion of the body portion 86 that is located on the downstream side in the sheet transport direction has an arc shape. In addition, a portion of the body portion 86 that is located on the upstream side in the sheet transport direction and located outside the endless chains 72 (i.e., a portion of the body portion 86 that is opposite to a portion of the body portion 86 that is surrounded by the endless chains 72 when viewed in the apparatus depth direction) has a projecting portion 86*b* projecting toward the plate portion 80. When viewed in a direction in which the projecting portion 86*b* projects, the projecting portion 86*b* has a rectangular shape.

The contact portion 88 is a plate member made of a stainless steel and is attached to a surface of the projecting portion 86*b*, the surface facing outside the endless chains 72. The contact portion 88 extends from the projecting portion 86*b* toward the plate portion 80 is configured to come into contact with the plate portion 80 from the outside of the endless chains 72.

In the above configuration, the shaft portion 84 is rotated by a cam mechanism (not illustrated), and the contact portion 88 is pressed from the outside of the endless chains 72 so as to come into contact with the plate portion 80 and moved away from the plate portion 80. In the manner described above, the leading end of the sheet member P is held by the holding members 76 and released from the held state.

[Transfer Device 30]

The transfer device 30 has a function of forming an ink image by causing inks that are discharged from print heads 20 for different colors (described later) to be superposed with one another on an intermediate transfer body having an ink-receptive particle layer 16A and transferring the ink image onto the sheet member P. As illustrated in FIG. 1, the transfer device 30 includes a transfer belt 31 that serves as the intermediate transfer body, a plurality of rollers 32, a transfer roller 34, and the counter roller 36. The transfer device 30 further includes an adhesive-layer forming unit 24, a particle supply unit 18, a cleaner 28, and contact/separation mechanisms 180.

As illustrated in FIG. 1, the transfer belt 31 has an endless loop shape and is wound around and stretched by the plurality of rollers 32 and the transfer roller 34 so as to have an inverted triangle shape when viewed from the front (when viewed from the near side in the apparatus depth direction). The transfer belt 31 rotates around these rollers in the direction of arrow B in response to at least one of the plurality of rollers 32 being driven so as to rotate. The print heads 20 for different colors, the particle supply unit 18, the adhesive-layer forming unit 24, and the cleaner 28 are arranged along an outer peripheral portion of the transfer belt 31. In addition, the transfer belt 31 is provided with a position sensor (not illustrated) that detects the position of the transfer belt 31 and transmits a detection result to the control device 110.

The transfer roller 34 is disposed in a space enclosed by the transfer belt 31. The transfer roller 34 is supported so as to be caused by the contact/separation mechanisms 180 (described later) to push against an inclined portion of the transfer belt 31 that is located on one side (the left-hand side in FIG. 1) in the width direction of the image forming apparatus 10 (hereinafter referred to as "apparatus width direction"), so that transfer roller 34 is capable of bringing the transfer belt 31 into a pressed state in which the transfer belt 31 is pressed against the counter roller 36 (described in detail later). The transfer roller 34 is an example of a pressing member. The counter roller 36 is an example of a transfer drum.

The counter roller 36 is disposed on the side opposite to the side on which the transfer roller 34 is disposed with the transfer belt 31 interposed therebetween. As illustrated in FIG. 7, the counter roller 36 extends in the apparatus depth direction.

The counter roller 36 is a cylindrical member made of aluminum and includes a roller portion 174 whose outer surface in a circumferential direction is coated with silicone rubber or a resin material such as a PFA resin and a pair of shaft portions 176 each of which extends in the apparatus depth direction from one of the two end portions of the roller portion 174. The above-mentioned sprockets 73 are each attached to one of the pair of shaft portions 176.

The sprockets 73 cause the counter roller 36 to be driven by rotation of the chains 72 of the chain gripper 66 so as to rotate in a direction C in which the chains 72 rotate.

The roller portion 174 of the counter roller 36 has a recess 178 that is formed so as to be capable of accommodating the holding members 76. The recess 178 has a groove shape extending in the apparatus depth direction from one end to the other end of the roller portion 174.

The counter roller 36 includes a heating source (not illustrated) built therein and has a configuration in which an outer peripheral portion of the counter roller 36 may be heated by the heating source.

The counter roller 36 forms a nip part NT between the counter roller 36 and the transfer roller 34 that pushes against the transfer belt 31 so as to press the transfer belt 31 against the counter roller 36. In other words, the nip part NT is formed between the counter roller 36 and the transfer belt 31. The counter roller 36 that is driven by rotation of the chains 72 so as to rotate causes the transfer belt 31 to rotate along with its rotation in the nip part NT. In the nip part NT, in a state where the sheet member P, which is transported by the chain gripper 66, is nipped between the outer peripheral portion of the counter roller 36 that has been heated and the transfer belt 31, the counter roller 36 causes the transfer belt 31 to rotate along with its rotation, so that an ink image formed on the transfer belt 31 is transferred onto the sheet member P.

As illustrated in FIG. 1, the adhesive-layer forming unit 24 is disposed on an end portion of a horizontal portion of the transfer belt 31 having an inverted triangle shape, the end being located on the one side in the apparatus width direction (the left-hand side in FIG. 1). The adhesive-layer forming unit 24 contains an adhesive agent and applies the adhesive agent to the outer peripheral surface of the transfer belt 31, which rotates, so as to form an adhesive layer (not illustrated). As the adhesive agent, for example, a glue, an organic solvent, or the like may be used.

The particle supply unit 18 is disposed at a position above the horizontal portion of the transfer belt 31, the position being downstream from the adhesive-layer forming unit 24 in the direction of rotation of the transfer belt 31. The particle supply unit 18 contains ink-receptive particles 16 that are capable of receiving ink droplets and supplies the ink-receptive particles 16 to the transfer belt 31 on which the adhesive layer has been formed. As a result, the ink-receptive particles 16 supplied to the transfer belt 31 by the particle supply unit 18 adhere to the adhesive layer by the adhesive force of the adhesive layer, and the ink-receptive particle layer 16A is formed onto the transfer belt 31.

The ink-receptive particle layer 16A formed on the transfer belt 31 comes into contact with the sheet member P, which is nipped between the transfer belt 31 and the counter roller 36 in the nip part NT, and is heated by the counter roller 36, so that the ink-receptive particle layer 16A is transferred onto the sheet member P. In this case, when an ink image is formed on the ink-receptive particle layer 16A as a result of the ink-receptive particle layer 16A receiving ink droplets, the ink image is transferred onto the sheet member P together with the ink-receptive particle layer 16A.

The cleaner 28 is disposed at a position that is downstream from the nip part NT in the direction of rotation of the transfer belt 31 and upstream from the adhesive-layer forming unit 24 in the direction of rotation of the transfer belt 31. The cleaner 28 includes a blade 28*a* that is in contact with the outer peripheral surface of the transfer belt 31. The cleaner 28 is configured to remove, by the blade 28*a*, the adhesive layer, the ink-receptive particles 16, and other foreign matters (e.g., paper dust in the case where the sheet member P is paper) remaining on a portion of the transfer belt 31 that has passed through the nip part NT along with rotation of the transfer belt 31.

Note that details of the transfer roller 34 and the contact/separation mechanisms 180 will be described later.

[Image Forming Section 12]

The image forming section 12 has a function of forming an image that is transferred onto the sheet member P by an ink-jet system. As illustrated in FIG. 8, the image forming section 12 is disposed on the other side in the apparatus width direction (the right-hand side in FIG. 8) with respect to the sheet feed mechanism 48. The image forming section 12 includes the plurality of print heads 20 each of which forms an ink image.

The plurality of print heads 20 are configured to form ink images of different colors. In the present exemplary embodiment, the print heads 20 that correspond to four colors of yellow (Y), magenta (M), cyan (C), and black (K) are provided. The letters Y, M, C, and K illustrated in FIG. 1 and FIG. 8 indicate components that correspond to the above-mentioned colors.

The print heads 20Y, 20M, 20C and 20K are basically configured in a similar manner except with regard to the inks they use. As illustrated in FIG. 1, the print heads 20Y, 20M, 20C and 20K are arranged along the horizontal portion of the transfer belt 31 in such a manner as to be positioned downstream from the particle supply unit 18 in the direction of rotation of the transfer belt 31.

The print heads 20Y, 20M, 20C and 20K discharge, on the basis of image information input to the image forming apparatus 10, ink droplets of the colors Y, M, C, and K onto the transfer belt 31 on which the ink-receptive particle layer 16A has been formed such that the ink droplets are superposed with one another. The ink droplets discharged by the print heads 20Y, 20M, 20C and 20K are received by the ink-receptive particle layer 16A and form an ink image. In other words, the image forming section 12 forms an image onto the transfer belt 31.

[Fixing Device 100]

The fixing device 100 has a function of fixing an ink image transferred to the sheet member P by the transfer device 30 onto the sheet member P.

As illustrated in FIG. 1, the fixing device 100 includes a preheating unit 102 that preheats the sheet member P, which is transported by the chain gripper 66, a heating unit 120 that heats the sheet member P, and a blowing unit 170 that blows air onto the sheet member P.

—Preheating Unit 102—

As illustrated in FIG. 1, the preheating unit 102 is disposed downstream from the nip part NT in the direction in which the sheet member P is transported (hereinafter referred to as "sheet transport direction") so as to face the upper surface of the sheet member P, which is transported. The preheating unit 102 includes a reflective member 104, a plurality of infrared heaters 106 (hereinafter referred to as "heaters 106"), and a metal mesh 112.

In the above configuration, the preheating unit 102 heats the sheet member P transported by the chains 72, which rotate, in a non-contact manner in the thickness direction of the sheet member P.

—Blowing Unit 170—

As illustrated in FIG. 1, the blowing unit 170 is disposed so as to face the preheating unit 102 in the thickness direction of the sheet member P, which is transported, and the sheet member P is transported so as to pass between the blowing unit 170 and the preheating unit 102. In addition, the blowing unit 170 includes a plurality of fans 172 that are arranged in the width direction of the sheet member P, which is transported, and in the sheet transport direction.

In the above configuration, the plurality of fans 172 blow the air toward the sheet member P, which is transported, so that the position of the sheet member P while being transported is stabilized.

—Heating Unit 120—

As illustrated in FIG. 1, the heating unit 120 is disposed downstream from the preheating unit 102 in the sheet transport direction. As illustrated in FIG. 6, the heating unit 120 includes a heating roller 130 that heats the sheet member P, which is transported, by coming into contact with the sheet member P and the pressure roller 140 that nips the sheet member P between the pressure roller 140 and the heating roller 130 and pressurizes the sheet member P toward the heating roller 130. The heating unit 120 further includes a heat-source roller 150 that serves as a heat source of the heating roller 130 and heats the heating roller 130 by being in contact with the heating roller 130.

In addition, the heating unit 120 includes support members 156 that support the pressure roller 140 by being in contact with a pair of shaft portions 148 each of which extends in the apparatus depth direction from one of the two end portions of the pressure roller 140. The heating unit 120 further includes urging members 158 that urge the pressure roller 140 toward the heating roller 130 via the support members 156. The above-mentioned sprockets 71 are each attached to one of the pair of shaft portions 148.

In the present exemplary embodiment, the heating roller 130 is driven by a motor (not illustrated) so as to rotate, and the pressure roller 140 and the heat-source roller 150 are configured to be driven by rotation of the heating roller 130. A rotational force of the heating roller 130 is transmitted to the sprockets 71 attached to the pair of shaft portions 148 of the pressure roller 140 so as to cause the chains 72 of the chain gripper 66 to rotate and transmitted to the sprockets 73 attached to the counter roller 36 so as to cause the counter roller 36 to rotate. In other words, the heating roller 130 causes the counter roller 36 to rotate in conjunction with rotation of the heating roller 130. In the present exemplary embodiment, the heating roller 130 is an example of a fixing roller.

Note that the present disclosure is not limited to a configuration in which the heating roller 130 is driven by a motor and in which the pressure roller 140 and the heat-source roller 150 are driven by the heating roller 130. For example, the pressure roller 140 may be driven by a motor, and the heating roller 130 and the heat-source roller 150 may be driven by the pressure roller 140. Alternatively, the heat-source roller 150 may be driven by a motor, and the heating roller 130 and the pressure roller 140 may be driven by the heat-source roller 150.

In the above configuration, the heating roller 130 and the pressure roller 140 transport the sheet member P, to which an ink image has been transferred, by nipping the sheet member P therebetween, so that the ink image is heated and fixed onto the sheet member P.

[Cooling Unit 90]

The cooling unit 90 has a function of cooling the sheet member P heated by the fixing device 100. As illustrated in FIG. 8, a sheet ejection path 42 is formed, and the sheet member P that is to be ejected out of an apparatus body 10*a* after an ink image has been fixed thereto by the fixing device

100 is transported along the sheet ejection path 42. The cooling unit 90 is disposed along the sheet ejection path 42.

Figure 9:
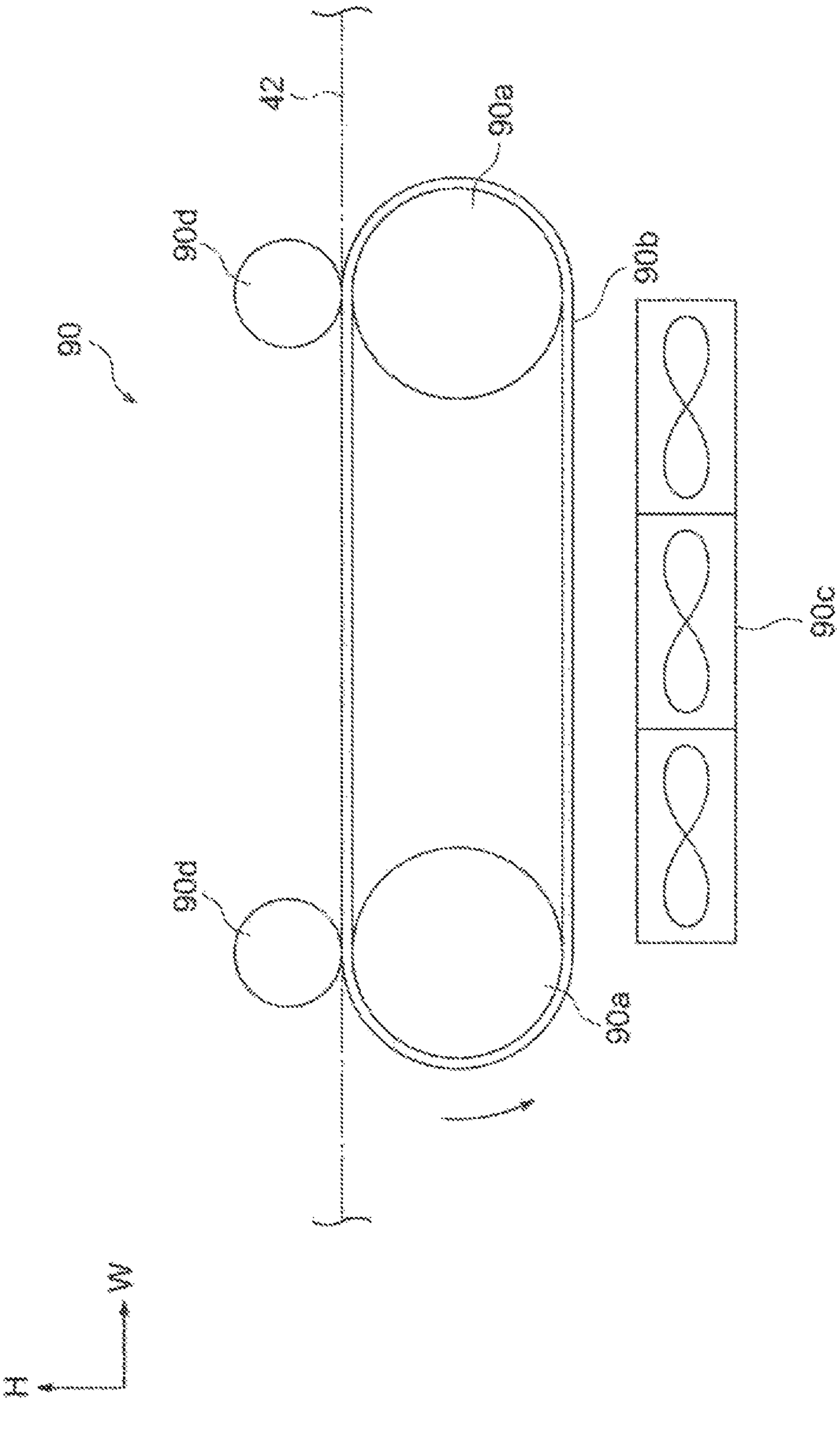
FIG. 9 is a schematic front view illustrating a configuration of a cooling unit according to the exemplary embodiment of the present disclosure.

As illustrated in FIG. 9, the cooling unit 90 includes two rollers 90*a* that are arranged in the apparatus width direction and an endless belt 90*b* that is wound around the two rollers 90*a* in such a manner that the upper surface thereof extends along the sheet ejection path 42. The cooling unit 90 further includes a cooling fan 90*c* that cools the belt 90*b* by blowing the air onto the lower surface of the belt 90*b* and rollers 90*d* that are arranged on the side opposite to the side on which the two rollers 90*a* are arranged with the sheet ejection path 42 and the belt 90*b* interposed between the rollers 90*d* and the rollers 90*a*.

In the above configuration, one of the two rollers 90*a* is driven so as to rotate. As a result, the belt 90*b* cooled by the cooling fan 90*c* rotates around the rollers 90*a* in the direction of an arrow in FIG. 9, so that the rollers 90*d* are driven by rotation of the belt 90*b* and rotate. In addition, the sheet member P is nipped and transported by the belt 90*b*, which rotates, and the rollers 90*d*, which are driven and rotate. As a result, the sheet member P is cooled.

[Sheet Ejection Mechanism 56]

The sheet ejection mechanism 56 has a function of ejecting the sheet member P cooled by the cooling unit 90 to the ejection unit 52 that is disposed outside the apparatus body 10*a*. As illustrated in FIG. 8, the sheet ejection mechanism 56 is disposed on the one side in the apparatus width direction (the left-hand side in FIG. 8) with respect to the image forming section 12. The sheet ejection mechanism 56 includes a plurality of transport rollers 54 transport the sheet member P along the sheet ejection path 42.

(Configuration of Principal Portion)

The transfer roller 34 and the contact/separation mechanisms 180 that are included in the transfer device 30 will now be described.

[Transfer Roller 34]

As illustrated in FIG. 7, the transfer roller 34 extends in the apparatus depth direction, and in the pressed state, the transfer roller 34 is in contact with the transfer belt 31 so as to press the transfer belt. 31 against the counter roller 36. The transfer roller 34 includes a shaft member 34*a* and a tubular roller portion 34*b* through which the shaft member 34*a* extends.

The two end portions of the shaft member 34*a* are each supported by a holder portion 182 of one of the contact/separation mechanisms 180 (see FIG. 2), which will be described later, with a bearing interposed between the end portion and the holder portion 182.

In the above configuration, when the transfer roller 34 is in contact with the transfer belt 31, the transfer roller 34 rotate along with rotation of the transfer belt 31.

[Contact/Separation Mechanisms 180]

Figure 2:
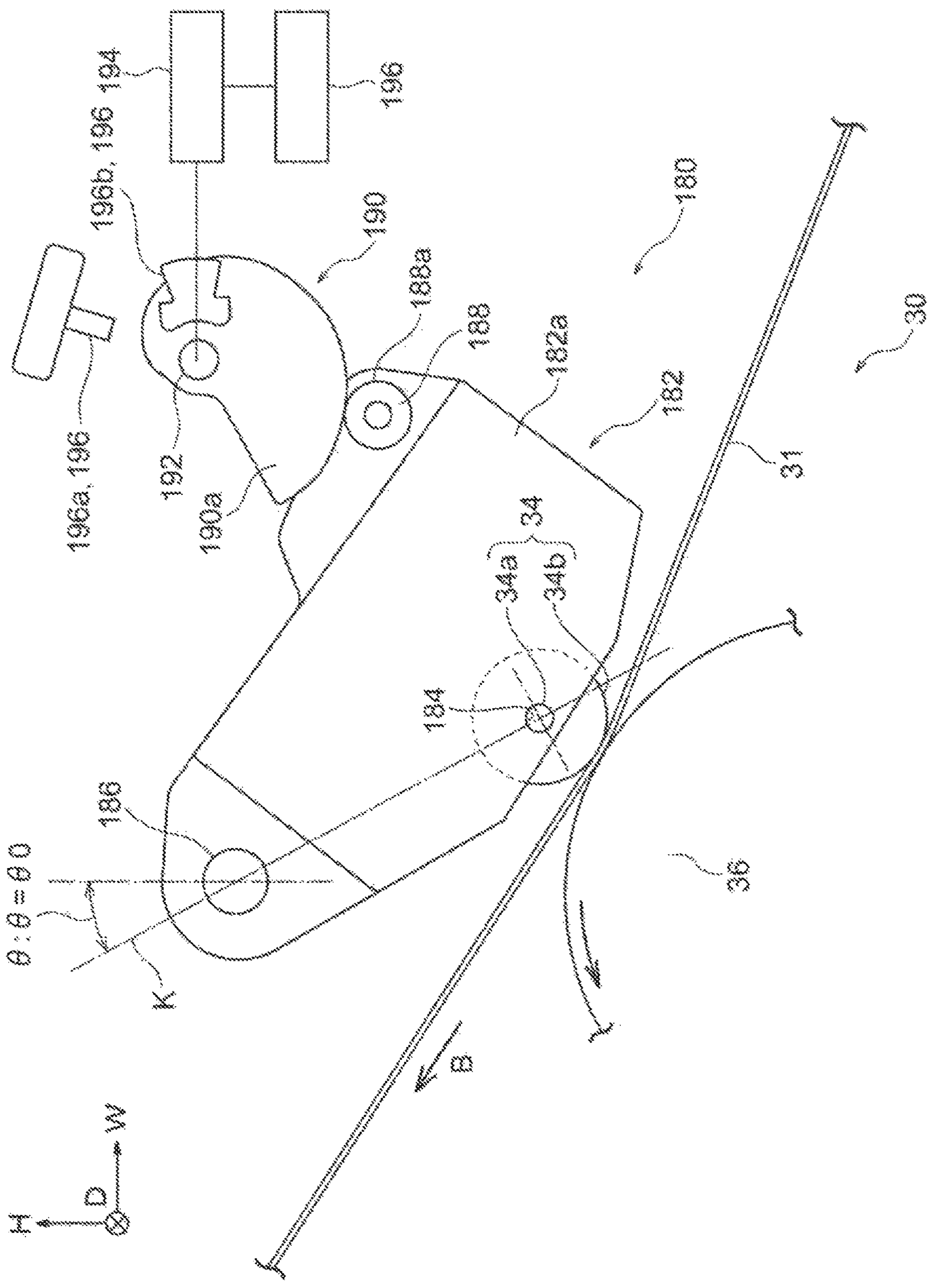
FIG. 2 is a front view illustrating a transfer roller and a switching unit in a pressed state according to the exemplary embodiment of the present disclosure.

The contact/separation mechanisms 180 are configured to move the transfer roller 34 so as to switch between the pressed state in which the transfer belt 31 is pressed against the counter roller 36 and a separated state in which the transfer belt 31 is separated from the counter roller 36. Each of the contact/separation mechanisms 180 is an example of a switching unit. As described above, the contact/separation mechanisms 180 are arranged in the space enclosed by the transfer belt 31 when viewed from the front, and each of the contact/separation mechanisms 180 is disposed on one of the two end portions of the shaft member 34*a* of the transfer roller 34. The contact/separation mechanisms 180 are basically configured in a similar manner. As illustrated in FIG. 2, each of the contact/separation mechanisms 180 includes the holder portion 182 and a cam portion 190.

The holder portion 182 includes a holder body 182*a*, a bearing 184, a swing shaft 186, and a cam follower 188. As illustrated in FIG. 2, the holder body 182*a* extends in a direction along the transfer belt 31 and is a member having a thin-plate-like shape extending in the height direction of the image forming apparatus 10 and the apparatus width direction. The bearing 184 is disposed on a portion of the holder body 182*a*, the portion being close to the transfer belt 31, and when viewed from the front, and supports the shaft member 34*a* of the transfer roller 34 such that the roller portion 34*b* of the transfer roller 34 partially projects from the holder body 182*a* toward the transfer belt 31.

In the present exemplary embodiment, the swing shaft 186 is disposed at a position further toward the one side in the apparatus width direction (the left-hand side in FIG. 2) than the bearing 184 of the holder body 182*a* is and supported by a frame (not illustrated) of the transfer device 30. The swing shaft 186 supports the holder body 182*a* such that the holder body 182*a* is capable of swinging. The swing shaft 186 is provided with a torsion coil spring (not illustrated) that is connected to the holder body 182*a* and the frame (not illustrated). This torsion coil spring urges the holder body 182*a* such that the holder body 182*a* pivots about the swing shaft 186 in a direction in which the transfer roller 34 moves away from the counter roller 36. In the present exemplary embodiment, the holder body 182*a* is caused to swing about the swing shaft 186 by the above-mentioned torsion coil spring and the cam portion 190, which will be described later. In the description of the present exemplary embodiment, the angle of an imaginary straight line K passing through the center of the swing shaft 186 and the center of the bearing 184 with respect to the height direction of the image forming apparatus 10 is set as an inclination angle $\theta$ of the holder portion 182.

Figure 3:
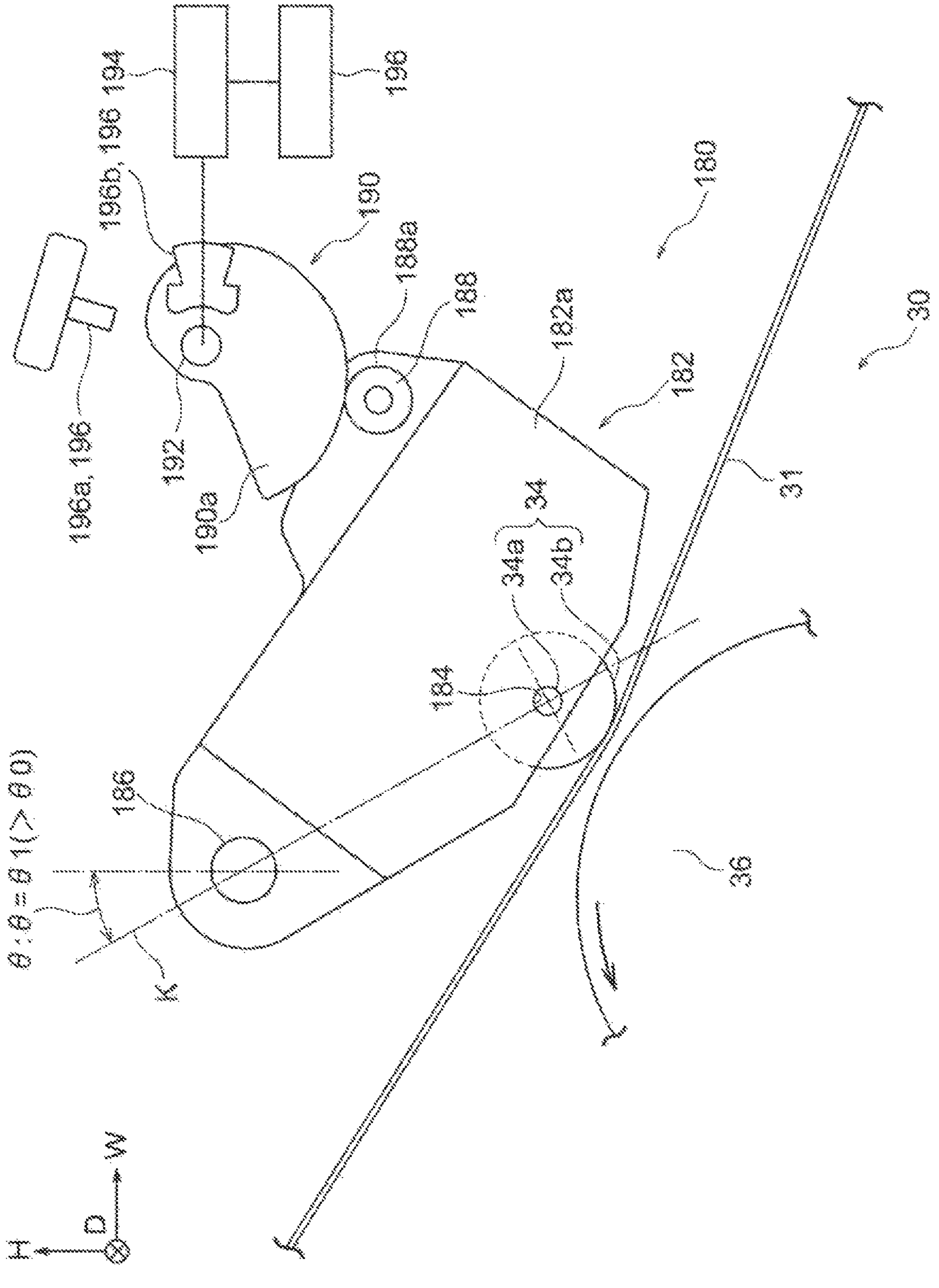
FIG. 3 is a front view illustrating the transfer roller and the switching unit in a first separated state according to the exemplary embodiment of the present disclosure.

The holder portion 182 is configured to move the transfer roller 34 as the holder body 182*a* swings so as to change the stretched state of the transfer belt 31. More specifically, when the inclination angle $\theta$ of the holder portion 182 is equal to a predetermined angle $\theta 0$ ($\theta=\theta 0$), the holder portion 182 is configured to bring the transfer belt 31 into the pressed state (see FIG. 2) in which the transfer belt 31 is pressed against the counter roller 36 by the transfer roller 34. In addition, as illustrated in FIG. 3, when the inclination angle $\theta$ of the holder portion 182 is equal to a predetermined angle $\theta 1$ that is larger than the angle $\theta 0$ ($\theta=\theta 1>\theta 0$), the holder portion 182 is configured to move the transfer roller 34 to a position that is spaced apart from the counter roller 36. In this case, the stretched state of the transfer belt 31 changes along with movement of the transfer roller 34, and the transfer belt 31 is brought into the separated state in which the transfer belt 31 is separated from the counter roller 36. In the present exemplary embodiment, the separated state when the inclination angle $\theta$ of the holder portion 182 is equal to the angle $\theta 1$ ($\theta=\theta 1$) will be referred to as a first separated state.

Figure 4:
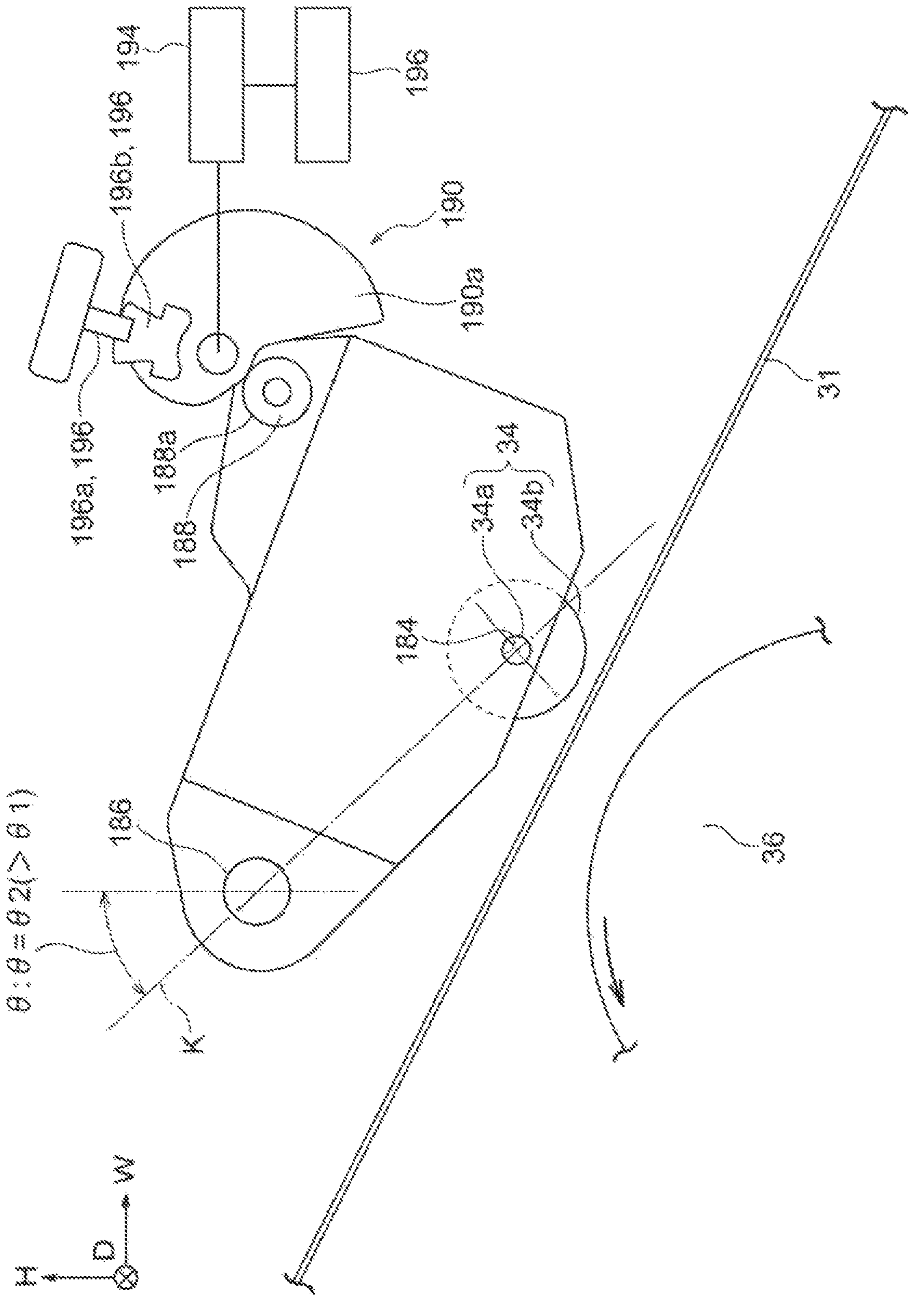
FIG. 4 is a front view illustrating the transfer roller and the switching unit in a second separated state according to the exemplary embodiment of the present disclosure.

Furthermore, as illustrated in FIG. 4, when the inclination angle $\theta$ of the holder portion 182 is equal to a predetermined angle $\theta 2$ that is larger than the angle $\theta 1$ ($\theta=\theta 2>\theta 1$), the holder portion 182 is configured to move the transfer roller 34 to a position that is further spaced apart from the counter roller 36 than in the first separated state. Accordingly, the transfer belt 31 is separated from the counter roller 36 by a distance larger than that in the first separated state. In the present exemplary embodiment, the separated state when the inclination angle $\theta$ of the holder portion 182 is equal to the angle $\theta 2$ ($\theta=\theta 2$) will be referred to as a second separated state.

In the present exemplary embodiment, in the second separated state, the holder portion 182 is configured to cause the transfer roller 34 to separate from the transfer belt 31. In other words, the contact/separation mechanisms 180 including the holder portion 182 is configured to cause the transfer roller 34 not to be in contact with the transfer belt 31 in the second separated state.

The holder portion 182 is configured to move the transfer roller 34 so as to bring the transfer roller 34 into the pressed state, so that an image formed on the transfer belt 31 may be appropriately transferred onto the sheet member P in the nip part NT. In other words, the pressed state is a state in which the transfer device 30 may appropriately transfer an image formed on the transfer belt 31 onto the sheet member P. The inclination angle θ of the holder portion 182 in the pressed state is not limited to the predetermined angle θ0 and may be any angle within a range in which the transfer device 30 is capable of appropriately transferring an image onto the sheet member P.

The pair of holder portions 182, each of which is disposed on one of the two end portions of the transfer roller 34, are configured to be capable of changing the position of the transfer roller 34 by adjusting the inclination angles θ of the holder portions 182 independently of each other. In addition, the transfer device 30 including the holder portions 182 is configured to be in the pressed state when the inclination angle θ of each of the holder portions 182 is within a range of +a predetermined angle Δθ with respect to the angle θ0 ($\theta0-\Delta\theta\leq\theta\leq\theta0+\Delta\theta$). When the holder portions 182 swing with their inclination angles θ within the range of ±the predetermined angle Δθ with respect to the angle θ0, the transfer roller 34 and the counter roller 36 move along with the swinging movement of the holder portions 182 while the transfer belt 31 is maintained in the pressed state.

In each of the holder portions 182, the cam follower 188 is a cylindrical member and is disposed on a portion of the holder body 182*a*, the portion being located on the side opposite to the side on which the swing shaft 186 is disposed with respect to the bearing 184 in the apparatus width direction. As illustrated in FIG. 2 to FIG. 4, the cam follower 188 includes an outer peripheral portion 188*a* that is in contact with the corresponding cam portion 190 and causes the holder portion 182 to swing in response to changes of a portion of the cam portion 190 that is in contact with the cam follower 188, so that the transfer roller 34 is moved.

Each of the cam portions 190 includes a cam body 190*a*, a rotary shaft 192, a driving unit 194, and a controller 196. In each of the cam portions 190, the cam body 190*a* is plate member having a substantially semicircular shape when viewed from the front. The cam body 190*a* has the structure of an eccentric cam that is rotatable about the rotary shaft 192. In addition, the cam body 190*a* is in contact with the outer peripheral portion 188*a* of the corresponding cam follower 188 by an urging force of the corresponding torsion coil spring (not illustrated), which is provided for the swing shaft 186 of the corresponding holder portion 182, applied to the corresponding holder body 182*a*. Furthermore, the cam body 190*a* is configured to change the phase thereof along with rotation of the rotary shaft 192 so as to change a portion of the cam body 190*a* that is in contact with the cam follower 188, so that the holder portion 182 swings, and the inclination angle θ of the holder portion 182 is changed. The rotary shaft 192 is supported by the frame (not illustrated) of the transfer device 30.

In each of the cam portions 190, the driving unit 194 includes a motor that is connected to the rotary shaft 192 via, for example, a transmission mechanism, and changes the phase of the cam body 190*a* by driving the rotary shaft 192 so that the rotary shaft 192 rotates. In other words, the driving unit 194 drives the cam portion 190. The driving unit 194 is provided individually for each of the contact/separation mechanisms 180. Each of the driving units 194 is an example of a driving unit.

In each of the cam portions 190, the controller 196 is configured to control the amount of driving of the cam unit 190 driven by the driving unit 194. As illustrated in FIG. 2, the controller 196 includes phase sensor 196*a* and a portion 196*b* that is to be detected and that is attached to the cam body 190*a*. The phase sensor 196*a* detects the phase of the cam body 190*a* by detecting the portion 196*b* and transmits a detection result to the control device 110. The controller 196 is configured to control the amount of driving of the cam portion 190 driven by the driving unit 194 on the basis of control information that is output by the control device 110 on the basis of a detection result obtained by the phase sensor 196*a* and a detection result obtained by the above-mentioned position sensor that detects the position of the transfer belt 31.

Each of the controllers 196 is configured to adjust the phase of the corresponding cam body 190*a* driven by the driving unit 194*a*, so that the phases of the pair of cam bodies 190*a* may be adjusted independently of each other. When the controllers 196 adjust the phases of the cam bodies 190*a* to be different from each other, in response to this adjustment, the inclination angles θ of the holder portions 182 become different from each other, and the position of the transfer roller 34, which is supported by the holder portions 182, is inclined with respect to the apparatus depth direction. In other words, each of the controllers 196 adjusts the amount of driving of the corresponding cam portion 190 driven by the corresponding driving unit 194, so that the position of the transfer roller 34 may be adjusted. Each combination of the cam portion 190 and the controller 196 is an example of an adjustment unit.

(Operation of Contact/Separation Mechanisms 180)

Operations of the contact/separation mechanisms 180 are controlled by the control device 110 on the basis of the state of the image forming apparatus 10 so as to switch among the pressed state, the first separated state, and the second separated state. The operations of the contact/separation mechanisms 180 based on the state of the image forming apparatus 10 will be described below.

The image forming apparatus 10 is in a non-operating state in which power is not supplied to the image forming apparatus 10, the transfer belt 31 is in the second separated state. In this case, power is not supplied to the fixing device 100, and the heating roller 130 is not heated.

When power is supplied to the image forming apparatus 10 in the non-operating state, the image forming apparatus 10 is brought into an operating state. When information regarding an image to be formed on the sheet member P is input to the image forming apparatus 10 in the operating state, the control device 110 supplies power to the fixing device 100 so as to enable the fixing device 100 to perform a warm-up operation. More specifically, in the warm-up operation, the control device 110 causes the heat-source roller 150 to heat the heating roller 130 that is in the state of not being heated until the temperature of the heating roller 130 reaches a fixing temperature that is suitable for fixing the image onto the sheet member P. In this case, the control device 110 causes the heating roller 130 to rotate by the motor (not illustrated) while the heating roller 130 is in contact with the heat-source roller 150 such that the temperature of the entire outer peripheral portion of the heating roller 130 increases to the fixing temperature. When the heating roller 130 rotates, the counter roller 36 is caused, by the chain gripper 66, to rotate in conjunction with rotation of the heating roller 130. In addition, in this case, the control device 110 controls the contact/separation mechanisms 180 so as to bring the transfer belt 31 into the first separated state as illustrated in FIG. 3.

When the temperature of the entire outer peripheral portion of the heating roller 130 has increased to the fixing temperature, as illustrated in FIG. 2, the control device 110 controls the contact/separation mechanisms 180 so as to bring the transfer belt 31 into the pressed state. In addition, the control device 110 controls the operation of each unit so as to cause the sheet member P in the accommodating unit 50 to be transported by the sheet feed mechanism 48 and the chain gripper 66 and so as to cause the image forming section 12 to form an image onto the transfer belt 31. The image formed on the transfer belt 31 is transferred onto the transported sheet member P in the nip part NT, and the image is fixed onto the sheet member P by the fixing device 100. Then, the sheet member P is cooled by the cooling unit 90, and the sheet member P is ejected to the ejection unit 52 by the sheet ejection mechanism 56.

In the case where information regarding an image to be formed on the sheet member P has not been input to the image forming apparatus 10, which is in the operating state, for a predetermined period of time or longer, the control device 110 causes the image forming apparatus 10 to transition to a power-saving state. More specifically, in the power-saving state, the control device 110 controls the contact/separation mechanisms 180 so as to bring the transfer belt 31 into the first separated state as illustrated in FIG. 3 and discontinues the supply of power excluding the supply of power to the fixing device 100. In addition, in the power-saving state, the control device 110 controls the fixing device 100 and causes the heating roller 130 to rotate by the motor (not illustrated) such that the number of rotation of the heating roller 130 per unit time is smaller than that during the warm-up operation until the temperature of the entire outer peripheral portion of the heating roller 130 reaches a predetermined temperature that is lower than the fixing temperature. In this case, the counter roller 36 rotates in conjunction with rotation of the heating roller 130 such that the number of rotation of the counter roller 36 per unit time is smaller than that during the warm-up operation.

When an operation of causing the image forming apparatus 10 to transition to the non-operating state is performed on the image forming apparatus 10 in the operating state or the power-saving state, as illustrated in FIG. 4, the control device 110 controls the contact/separation mechanisms 180 so as to bring the transfer belt 31 into the second separated state and discontinues the supply of power to each component. The operation of causing the image forming apparatus 10 to transition to the non-operating state includes switching off of the image forming apparatus 10 and transition to maintenance of the image forming apparatus 10. The maintenance of the image forming apparatus 10 includes replacement of a member of the transfer belt 31 of the transfer device 30.

Operations and Effects

Operations and effects of the present exemplary embodiment will now be described. Note that, in the following description, when components and the like that are similar to those included in the image forming apparatus 10 of the present exemplary embodiment are used in a comparative example of the present exemplary embodiment, the names and the reference signs that are the same as those in the present exemplary embodiment are used for the components and the like of the comparative example.

The transfer device 30 of the image forming apparatus 10 of the present exemplary embodiment includes the contact/separation mechanisms 180 that move the transfer roller 34 so as to switch between the pressed state in which the transfer belt 31 is pressed against the counter roller 36 and the separated state in which the transfer belt 31 is separated from the counter roller 36. The image forming apparatus 10 of the present exemplary embodiment and an image forming apparatus 210 of the comparative example, which will be described below, will be compared.

The image forming apparatus 210 of the comparative example does not include the contact/separation mechanisms 180 and has a configuration in which the transfer belt 31 is continuously pressed against the counter roller 36 by the transfer roller 34. The configuration of the image forming apparatus 210 of the comparative example, excluding the above, is similar to that of the image forming apparatus 10 of the present exemplary embodiment.

In the image forming apparatus 210 of the comparative example, the transfer belt 31 is continuously pressed against the counter roller 36 by the transfer roller 34. Thus, also during the warm-up operation in which image formation is not performed, the transfer belt 31 rotates along with the counter roller 36, which is caused to rotate in conjunction with rotation of the heating roller 130 by the chain gripper 66. If the transfer belt 31 rotates during a period when image formation is not performed, there is a possibility that deterioration of the transfer belt 31 will be accelerated as a result of the transfer belt 31 rotating while being in contact with the blade 28*a* of the cleaner 28.

In contrast, the transfer device 30 of the present exemplary embodiment includes the contact/separation mechanisms 180. As a result, in the transfer device 30, the transfer belt 31 may be brought into the separated state during the warm-up operation or the like in which image formation is not performed. In the separated state, the transfer belt 31 is separated from the counter roller 36, and thus, the transfer belt 31 does not rotate along with rotation of the counter roller 36.

The transfer device 30 of the present exemplary embodiment has a configuration in which the contact/separation mechanisms 180 switch the separated state between the first separated state and the second separated state in which the transfer belt 31 is separated from the counter roller 36 by a distance larger than that in the first separated state.

In addition, the transfer device 30 of the present exemplary embodiment has a configuration in which the contact/separation mechanisms 180 cause the transfer roller 34 not to be in contact with the transfer belt 31 in the second separated state.

Furthermore, in the transfer device 30 of the present exemplary embodiment, the contact/separation mechanisms 180 each include an adjustment unit that includes the cam portion 190 and the controller 196 and that adjusts the position of the transfer roller 34. Effects of the transfer device 30 that includes the contact/separation mechanisms 180 each including the adjustment unit will be described below.

In the transfer device 30 having a configuration in which the state of the transfer belt 31 is switched between the pressed state and the separated state, there is a possibility that the position of the transfer belt 31, which is wound around the transfer roller 34, will be inclined with respect to the direction of rotation of the transfer belt 31 in response to switching between the pressed state and the separated state. If the transfer belt 31 rotates in such a position inclined with respect to the direction of rotation of the transfer belt 31, there is a possibility that the transfer belt 31 will be skewed.

In contrast, the transfer device 30 of the present exemplary embodiment has a configuration in which the position of the transfer roller 34 is adjusted by the cam portions 190 and the controllers 196. Since the transfer belt 31 is wound around the transfer roller 34, the position of the transfer belt 31 with respect to the direction of rotation of the transfer belt 31 changes depending on the position of the transfer roller 34.

In the transfer device 30 of the present exemplary embodiment, in the pressed state, the cam portions 190 and the controllers 196 correct the position of the transfer belt 31 on the basis of a detection result obtained by the position sensor that detects the position of the transfer belt 31.

In the transfer device 30 of the present exemplary embodiment, each of the contact/separation mechanisms 180 includes one of the cam portions 190, which are arranged at the two end portions of the transfer roller 34, and the driving unit 194. In addition, in the transfer device 30 of the present exemplary embodiment, the adjustment units that adjust the position of the transfer roller 34 in the pressed state each include the controller 196 that controls the amount of driving of the corresponding cam portion 190 driven by the corresponding driving unit 194.

The image forming apparatus 10 that includes the transfer device 30 of the present exemplary embodiment has a configuration in which the control device 110 brings each of the contact/separation mechanisms 180 into the first separated state during a period when the fixing device 100 performs the warm-up operation.

In addition, the image forming apparatus 10 that includes the transfer device 30 of the present exemplary embodiment has a configuration in which the control device 110 brings each of the contact/separation mechanisms 180 into the second separated state when the maintenance of the image forming apparatus 10 is performed.

Figure 10:
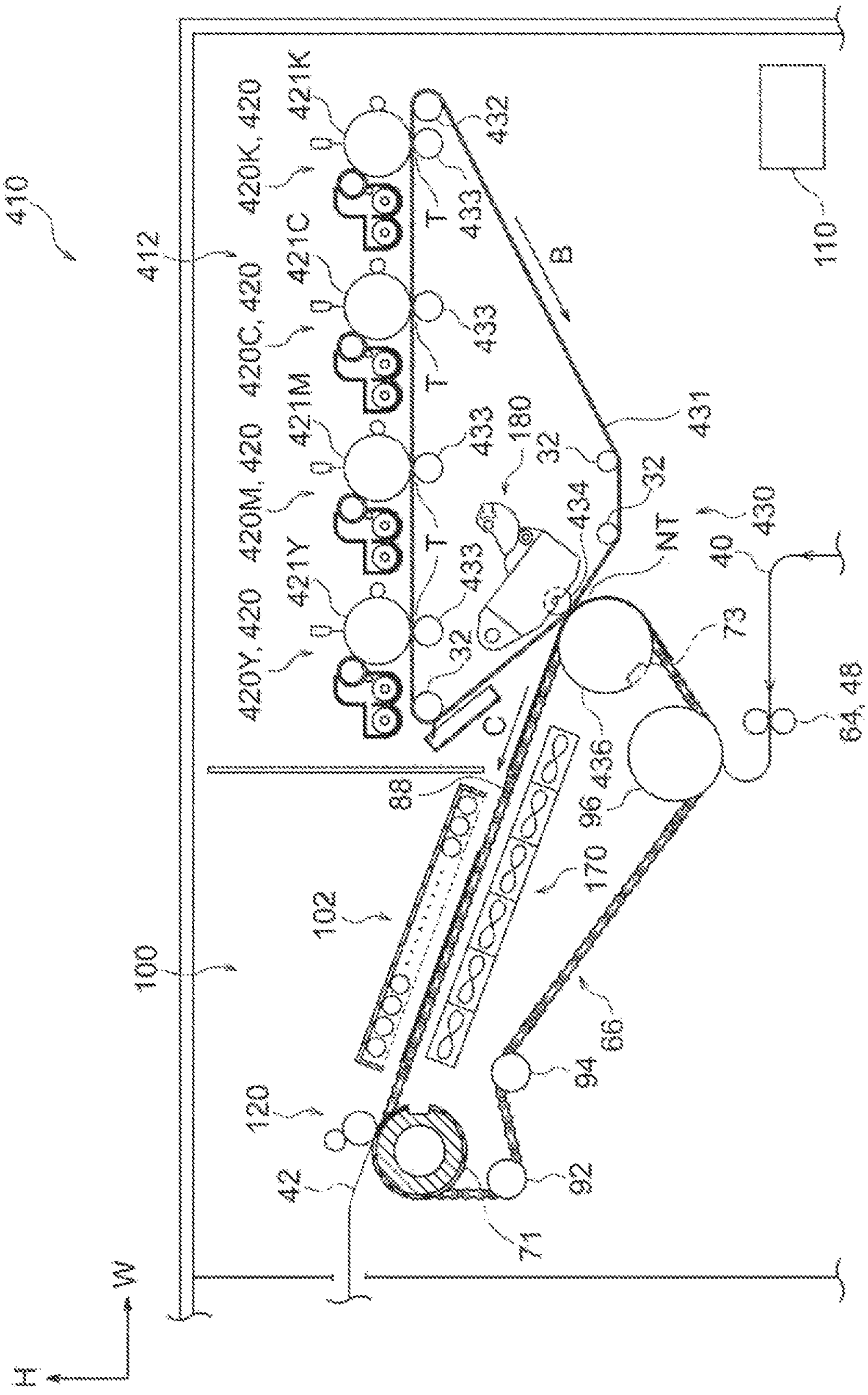
FIG. 10 is a schematic front view illustrating an example of an image forming apparatus that includes the transfer device according to the exemplary embodiment of the present disclosure and that employs an electrophotographic system.

Note that the above-described operations of the present disclosure are not limited to an image forming apparatus that employs an ink-jet system, and similar operations may be obtained by an electrophotographic image forming apparatus that forms an image by using a toner. An image forming apparatus 410 of the present disclosure that is an example of an electrophotographic image forming apparatus will be described below. As illustrated in FIG. 10, the image forming apparatus 410 includes an image forming section 412 and a transfer device 430 instead of the image forming section 12 and the transfer device 30 of the image forming apparatus 10. The transfer device 430 includes a transfer belt 431, a second transfer roller 434, and a counter roller 436 instead of the transfer belt. 31, the transfer roller 34, and the counter roller 36. The second transfer roller 434 is an example of a pressing member. The counter roller 436 is an example of a transfer drum. The transfer device 430 further includes first transfer rollers 433 that correspond to different colors of an image and around which the transfer belt 431 is wound. The image forming section 412 includes, instead of the print heads 20 of the image forming apparatus 10, a plurality of toner-image forming units 420Y, 420M, 420C, and 420K that form toner images. The toner-image forming units 420 for the different colors each include a photoconductor drum 421 that is disposed on the side opposite to the side on which a corresponding one of the first transfer rollers 433 is disposed with the transfer belt 431 interposed therebetween. The toner-image forming units 420 form toner images onto the photoconductor drums 421 for the different colors and transfer these toner images onto the transfer belt 431 at first transfer positions T that are formed between photoconductor drums 421 and the first transfer rollers 433. The toner images transferred to the transfer belt 431 are transferred onto the sheet member P in the nip part NT that is formed between the second transfer roller 434 and the counter roller 436. The configuration of the electrophotographic image forming apparatus 410, excluding the above, is similar to that of the image forming apparatus 10 that employs an ink-jet system. In other words, the transfer device 430 of the image forming apparatus 410 includes the contact/separation mechanisms 180 like the transfer device 30 of the image forming apparatus 10. In the image forming apparatus 410, the contact/separation mechanisms 180 move the second transfer roller 434 switch between the pressed state in which the transfer belt 431 is pressed against the counter roller 436 and the separated state in which the transfer belt 431 is separated from the counter roller 436.

Although the specific exemplary embodiment of the present disclosure has been described as described above, the present disclosure is not limited to the above-described exemplary embodiment, and various modifications, changes, and improvements may be made within the technical concept of the present disclosure.

For example, in the above-described exemplary embodiment, the contact/separation mechanisms 180, each of which is an example of a switching unit, are configured to switch among the pressed state, the first separated state, and the second separated state. However, each of the switching units of the present disclosure may be configured to switch between the pressed state and a single separated state.

In the above-described exemplary embodiment, in the second separated state, the transfer roller 34 is not in contact with the transfer belt 31. However, in the present disclosure, the transfer roller 34 may be in contact with the transfer belt 31 in the second separated state.

In the above-described exemplary embodiment, the contact/separation mechanisms 180 each include the adjustment unit that adjusts the position of the transfer roller 34 in the pressed state. However, in the present disclosure, each of the contact/separation mechanisms 180 does not need to include the adjustment unit.

In the above-described exemplary embodiment, each of the adjustment units includes the controller 196 that controls the amount of driving of the corresponding cam portion 190 driven by the corresponding driving unit 194. However, in the present disclosure, each of the adjustment units may be configured to adjust the position of the transfer roller 34 by using a cam mechanism that is a different member from the cam portion 190 of the contact/separation mechanism 180.

In the above-described exemplary embodiment, the contact/separation mechanisms 180, each of which is an example of the switching unit, are configured to move the transfer roller 34 by the swinging movement of the holder portions 182 including the swing shafts 186. However, each of the switching units in the present disclosure is not limited to having a swing shaft. For example, each of the switching units may be configured to move the transfer roller 34 by using a translational actuator.

In the above-described exemplary embodiment, the inclination angle θ of each of the holder portions 182 is changed by the corresponding cam portion 190 having the structure of an eccentric cam. However, in the present disclosure, the units that change the inclination angle θ of the respective holder portions 182 are not limited to units each having the structure of an eccentric cam. For example, each of the holder portions 182 may be configured to change the inclination angle θ of the holder portion 182 by using a direct-acting actuator.

In the above-described exemplary embodiment, when the warm-up operation is performed or when the image forming apparatus 10 is in the power-saving state, the transfer belt 31 is in the first separated state. However, in the present disclosure, when the warm-up operation is performed or when the image forming apparatus 10 is in the power-saving state, the transfer belt 31 may be in the second separated state.

In the above-described exemplary embodiment, when the image forming apparatus 10 is in the non-operating state, the transfer belt 31 is in the second separated state. However, in the present disclosure, when the image forming apparatus 10 is in the non-operating state, the transfer belt 31 may be in the first separated state.

In the above-described exemplary embodiment, the transfer roller 34 and the second transfer roller 434 are each an example of a pressing member. However, the pressing member in the present disclosure is not limited to being formed of only a roll-shaped member as long as it is capable of pressing the transfer belt against the transfer drum in the pressed state. In the present disclosure, the pressing member may be formed by integrally incorporating the transfer roller 34 or the second transfer roller 434 into another functional member. An example of the other functional member is an applying unit that applies voltage or supply current to the second transfer roller 434. Alternatively, the combination of the transfer roller 34 and the holder bodies **182*a*** may be considered as the pressing member.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A transfer device comprising:
a transfer drum that rotates in conjunction with a fixing roller;
a transfer belt that transfers an image onto a medium while rotating along with the transfer drum in a state where the medium is nipped between the transfer belt and the transfer drum;
a pressing member that is disposed in a space enclosed by the transfer belt; and
a switching unit that moves the pressing member and switches between a pressed state in which the transfer belt is pressed against the transfer drum and a separated state in which the transfer belt is separated from the transfer drum, wherein the switching unit includes a holder portion, a cam portion, and a swing shaft, the holder portion pivoting about the swing shaft based on a movement of the cam portion, wherein
the switching unit switches, as the separated state, between a first separated state and a second separated state in which the transfer belt is separated from the transfer drum by a distance larger than a distance between the transfer belt and the transfer drum in the first separated state.

2. The transfer device according to claim 1,
wherein the switching unit causes the pressing member not to be in contact with the transfer belt in the second separated state.

3. The transfer device according to claim 1,
wherein the pressing member extends in a width direction of the transfer belt and is configured to rotate along with the transfer belt.

4. The transfer device according to claim 2,
wherein the pressing member extends in a width direction of the transfer belt and is configured to rotate along with the transfer belt.

5. The transfer device according to claim 3,
wherein the switching unit includes a plurality of the cam portions that are arranged at two end portions of the pressing member, and a driving unit that drives the cam portions, and
wherein the switching unit includes an adjustment unit that adjusts a position of the pressing member in the pressed state, the adjustment unit including the cam portions and a controller that controls an amount of driving of each of the cam portions driven by the driving unit.

6. The transfer device according to claim 4,
wherein the switching unit includes a plurality of the cam portions, which are arranged at two end portions of the pressing member, and a driving unit that drives the cam portions, and
wherein the switching unit includes an adjustment unit that adjusts a position of the pressing member in the pressed state, the adjustment unit including the cam portions and a controller that controls an amount of driving of each of the cam portions driven by the driving unit.

7. An image forming apparatus comprising:
the transfer device according to claim 1;
a fixing device that includes the fixing roller and fixes an image transferred to the medium onto the medium;
an interlocking unit that causes the transfer drum to rotate in conjunction with the fixing roller; and
a control device that brings the switching unit into the separated state when the fixing device performs a warm-up operation.

8. An image forming apparatus comprising:
the transfer device according to claim 2;
a fixing device that includes the fixing roller and fixes an image transferred to the medium onto the medium;
an interlocking unit that causes the transfer drum to rotate in conjunction with the fixing roller; and
a control device that brings the switching unit into the separated state when the fixing device performs a warm-up operation.

9. An image forming apparatus comprising:
the transfer device according to claim 3;
a fixing device that includes the fixing roller and fixes an image transferred to the medium onto the medium;
an interlocking unit that causes the transfer drum to rotate in conjunction with the fixing roller; and
a control device that brings the switching unit into the separated state when the fixing device performs a warm-up operation.

10. An image forming apparatus comprising:

the transfer device according to claim 4;

a fixing device that includes the fixing roller and fixes an image transferred to the medium onto the medium;

an interlocking unit that causes the transfer drum to rotate in conjunction with the fixing roller; and a control device that brings the switching unit into the separated state when the fixing device performs a warm-up operation.

11. An image forming apparatus comprising:

the transfer device according to claim 5;

a fixing device that includes the fixing roller and fixes an image transferred to the medium onto the medium;

an interlocking unit that causes the transfer drum to rotate in conjunction with the fixing roller; and a control device that brings the switching unit into the separated state when the fixing device performs a warm-up operation.

12. An image forming apparatus comprising:

the transfer device according to claim 6;

a fixing device that includes the fixing roller and fixes an image transferred to the medium onto the medium;

an interlocking unit that causes the transfer drum to rotate in conjunction with the fixing roller; and a control device that brings the switching unit into the separated state when the fixing device performs a warm-up operation.

13. The image forming apparatus according to claim 7, wherein:

the control device brings the switching unit into the first separated state when the fixing device performs the warm-up operation.

14. The image forming apparatus according to claim 7, wherein:

the control device brings the switching unit into the second separated state when maintenance of the transfer device is performed.

15. The transfer device according to claim 1, wherein the transfer drum and the fixing roller rotate in conjunction with each other via a chain connected between the transfer drum and the fixing roller.

* * * * *